May 14, 1935.　　　R. E. PAIGE　　　2,001,499
DISPLAY DEVICE
Filed Dec. 4, 1934　　　3 Sheets-Sheet 1
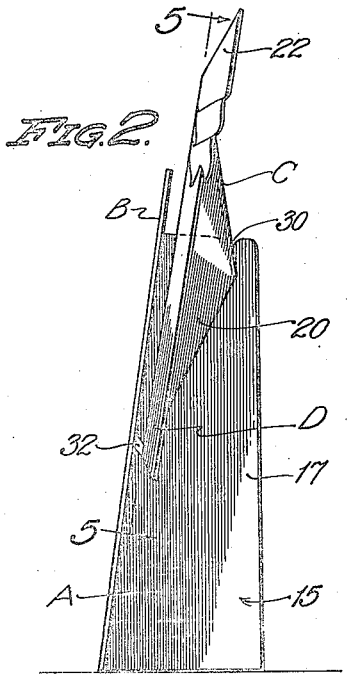
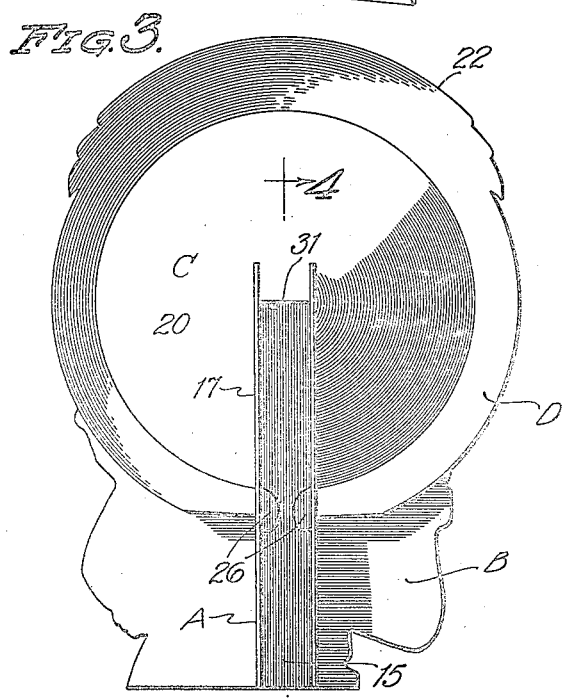
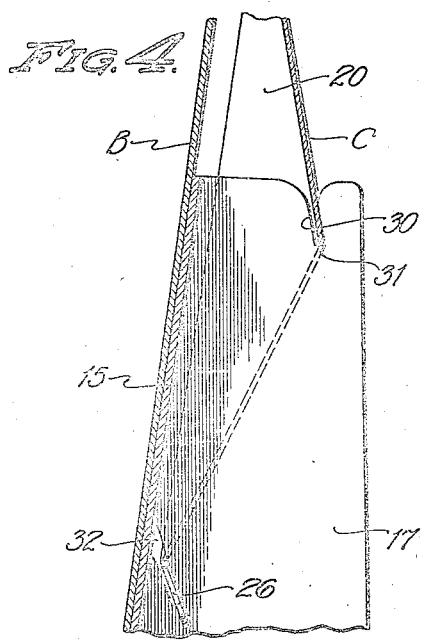
INVENTOR.
RICHARD E. PAIGE.
BY
ATTORNEYS.

May 14, 1935.　　　　R. E. PAIGE　　　　2,001,499
DISPLAY DEVICE
Filed Dec. 4, 1934　　　3 Sheets-Sheet 2
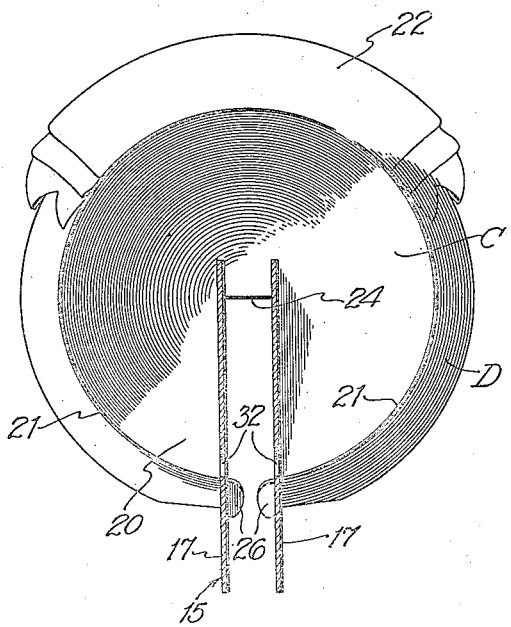
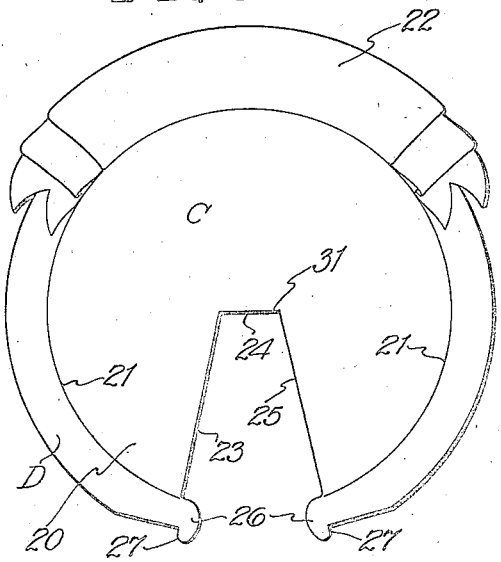
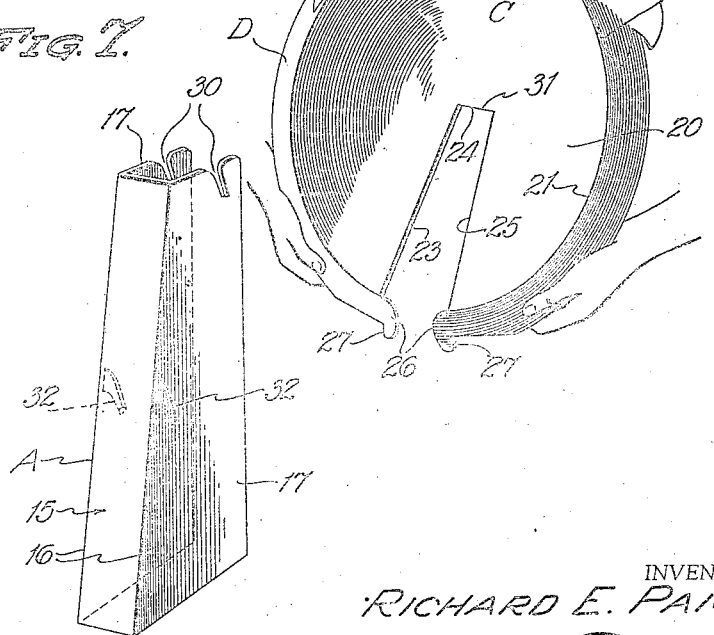
INVENTOR.
RICHARD E. PAIGE.
BY
Ely Pattison
ATTORNEYS.
WITNESS:

May 14, 1935.  R. E. PAIGE  2,001,499
DISPLAY DEVICE
Filed Dec. 4, 1934   3 Sheets-Sheet 3
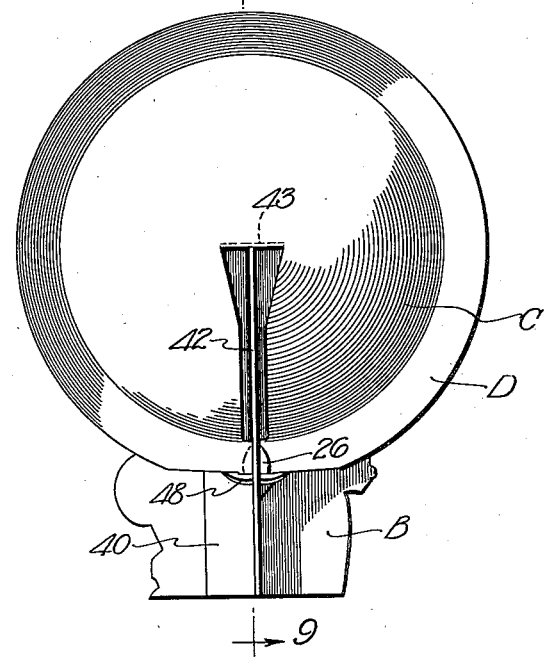
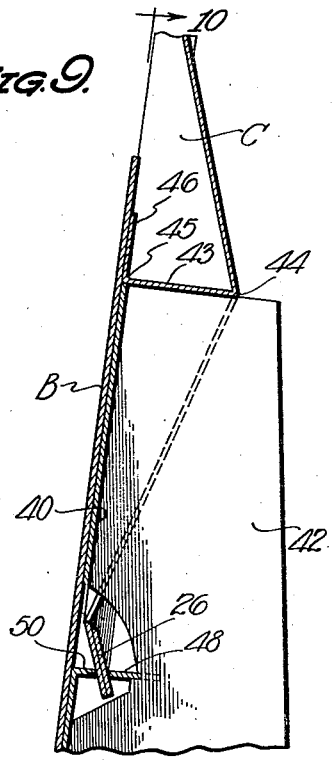
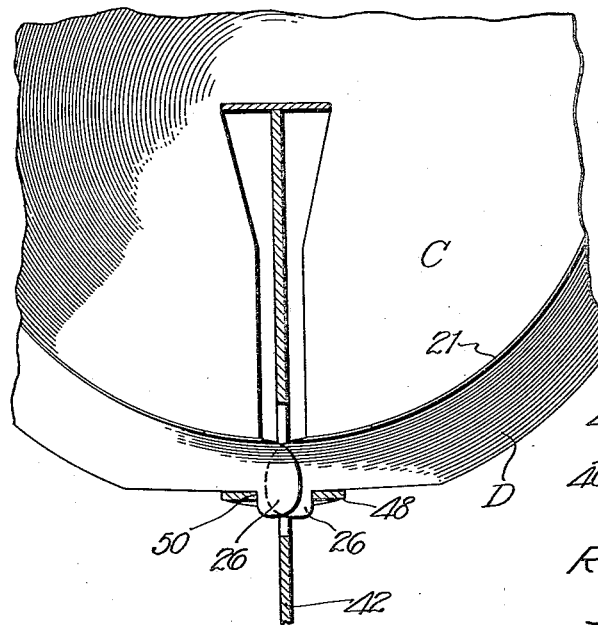
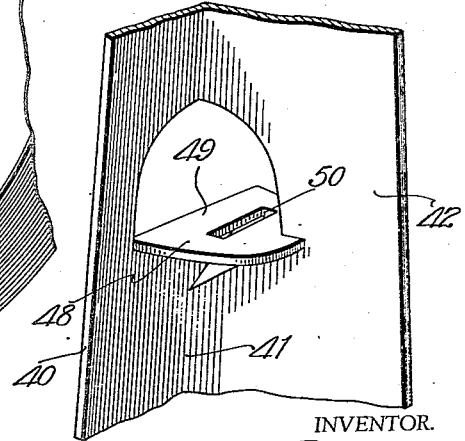
INVENTOR.
RICHARD E. PAIGE.
BY Ely Pattison.
ATTORNEYS.
WITNESS:

Patented May 14, 1935

2,001,499

UNITED STATES PATENT OFFICE 2,001,499

DISPLAY DEVICE

Richard Eaton Paige, Flushing, N. Y.

Application December 4, 1934, Serial No. 755,859

13 Claims. (Cl. 40—126)

The present invention relates to new and useful improvements in display devices, and more particularly it pertains to display devices in which there are display elements in two planes, and commonly known in the trade as "two plane" displays.

It is one of the objects of the present invention to provide a display device of novel form which may be collapsed into flat position for the purpose of shipment and transportation and which, upon arrival at its destination, may be erected in display position.

It is a further object of the invention to provide a new and novel display device in which the erecting operation is simple and may be readily accomplished without the use of special tools or devices.

Such displays as above mentioned are usually supported by a prop, commonly termed in the trade as an easel, and it is a further object of the present invention to construct the device that it may function together with the prop or easel to retain the same in operative display supporting position.

It is still a further object of the invention so to construct the device that it may be assembled, erected and knocked down as often as desired without impairing any of the parts thereof.

With the above and other objects in view reference will be had to the accompanying drawings, in which:

Figure 1 is a view in perspective of a display device constructed in accordance with one form of the present invention, Figure 2 is a view in side elevation thereof, Figure 3 is a view in rear elevation thereof, Figure 4 is a vertical longitudinal sectional view taken on the line 4—4 of Figure 3, Figure 5 is a vertical sectional view taken on the line 5—5 of Figure 2, Figure 6 is a plan view of one of the display elements employed, Figure 7 is a schematic view illustrating the manner in which the device of the form illustrated in Figures 1 to 6, may be erected, Figure 8 is a rear elevation of a display device illustrating a slightly modified form of the invention, Figure 9 is a vertical sectional view taken substantially on the line 9—9 of Figure 8, Figure 10 is an enlarged fragmentary detail sectional view taken substantially on the line 10—10 of Figure 9, and Figure 11 is a fragmentary perspective view of a portion of the easel or prop, the view being upon an enlarged scale.

The display devices illustrated in the present embodiment of the invention consist of display elements arranged in two planes, that is, one of the display elements is arranged to the rear of the other. For the sake of more clearly presenting the invention, throughout the specification and the claims the front display element will be referred to as the main display element, the term secondary display element being applied to that display element positioned to the rear. It is to be understood, however, that the terms "main" and "secondary" are not used in a qualifying sense and are merely used to distinguish one from the other.

In that form of the invention illustrated in Figures 1 to 7, inclusive, the display device is supported in display position by an easel or prop, known in the trade as of the two wing type, and this prop is designated A in the drawings. It comprises a main body portion 15 and is scored as at 16 to provide two rearwardly extending wings 17. The main body portion 15 is suitably secured to the rear face of the main display element which is designated B in the drawings. In the knocked down or collapsed position of the device, the wings 17 occupy a position in substantially the same plane as the plane of the body portion 15. In the set up position of the device the wings occupy the position in which they are shown in Figures 2 to 7, inclusive.

The main display element designated B may be of any desired ornamental shape or configuration such for example, as the picturization of a lady holding a box between her hands as employed in the accompanying drawings.

The secondary display element which is designated C is so constructed and arranged that it may be circumflexed in order to give a depth or thickness thereto when it is circumflexed and to permit the same to lie flat when not circumflexed. This secondary display element may be constructed as above described by following the method set forth in my co-pending application, Serial No. 658,507.

When the secondary display element is circumflexed as above described, a certain tension is produced therein and in the present embodiment of the invention I utilize this tension to advantage in a manner which will be hereinafter explained.

The secondary display element consists of a main body portion 20 which may be scored along the line 21 and may have an ornamental section such as 22. This main body portion is cut out along the lines designated 23, 24, and 25 to provide an opening which is adapted to straddle or embrace the two wing prop when the same is in its erected or supporting position. Tongues such as 26 provided with shoulders 27, are provided for interlocking engagement with the wings of the prop A to aid in maintaining the prop in supporting position.

The wings 17 of the prop A in this form of the invention have their upper ends notched as at 30, and these notches are adapted to receive the end wall 31 of the cut out portion of the secondary display element when the device is to be assembled and the wings 17 are also provided with slots 32 in which the tongues 26 are adapted to interlock.

As heretofore stated, the prop A is secured to the rear face of the main display element B and is adapted to lie flat thereagainst when the display device is collapsed. The secondary display element is adapted also to lie flat against the main display element in collapsed position. When, however, it is desired to erect the display device, the wings 17 of the prop are moved to that position in which they are illustrated in Figures 2 to 7, inclusive. The secondary display element is now grasped by the hands of the erector as illustrated in Figure 7 and placed over the prop with the cut out portion of the secondary display element straddling or embracing the prop. The end wall 31 of the cut out portion is positioned in the notches 30, heretofore mentioned, after which the hooks 26 are brought towards each other and engaged in the slots 32. When the hooks 26 are brought towards each other, the secondary display element C will be circumflexed and will fold upon the score line 21, heretofore mentioned, to assume a dished or substantially conical formation having a flange such as D defining its outer peripheral edge. This circumflexion of the secondary display element produces a tension therein and this tension tends to pull the wings 17 of the prop outwardly. The wings 17 of the prop are, however, prevented from pulling outwardly since under the tension exerted by the circumflexed secondary display element they are pulled into engagement with the side walls of the cut out portion which serve as stops to prevent them spreading to a point where they would not support both of the display elements in their assembled position.

As commonly constructed in the art, these two wing props employ a lock to hold them in their erected or set up position, but it is obvious that by the construction afore-described this lock may be entirely dispensed with, the prop being held in its erected position by the tension produced by circumflexion of the secondary display element and its limitation of movement by engagement with the side walls of the cut out portion of said secondary display element.

To collapse the device it is only necessary to lift the hooks 26 out of engagement with the slots 32, thus releasing the tension of the circumflexed secondary display element, and lift the same out of engagement with the notches 30, whereupon the wings 17 of the prop are free to move flat against the rear face of the main display element, and the device is disassembled.

In Figures 8 to 11 of the accompanying drawings I have illustrated a modified form of the invention in which the prop is of the type known in the trade as a single wing easel or prop. In this form of the invention the prop comprises a body portion 40 scored along the line 41 to provide a wing 42, and it is secured to the main display element in any desired manner by fastening of the body portion 15 directly to the rear face of said main display element.

The main display element is designated B, the secondary display element being designated C, as in the heretofore described form, and these two display elements are substantially the same in construction as those described in connection with the heretofore described form of the invention.

In that form of the invention illustrated in Figures 8 to 11, however, the main display element and the secondary display element are permanently attached together and I prefer to accomplish this by utilizing a portion of the material cut from the secondary display element to provide the cut out portion which straddles the easel or prop. This portion is designated 43 in the drawings and is bent upon the line 44 which forms the inner end of the cut out portion and upon the line 45 to provide an upstanding portion 46 which is secured to the rear face of the main display element B. In this form of the invention, the secondary display element has the interlocking hooks 26 but they are utilized in a slightly different manner as will now be described.

When the supporting easel or prop is in its supporting position, the wing 42 thereof occupies a position at substantially right angles to the main body portion 40 thereof, and is maintained in this position by a member 48 which is bent down into engagement with the wing 42 along the line 49, and which is known in this type of device as the easel lock. In carrying out my invention, I provide this easel lock with a slot 50 which, when the device is in its erected position, receives the tongues 26 of the secondary display device after the same has been circumflexed as heretofore described, and the tension produced by circumflexion of the secondary display device will serve to hold these locking tongues in locking engagement with the slot 50 and maintain the device in its erected position.

When it is desired to collapse the device it is only necessary to disengage the hooked ends 26 with the slot 50 whereupon the locking member 48 can be moved out of engagement with the wing 42 of the easel or prop and all of the several parts folded flat against the rear face of the main display element.

From the foregoing it will be apparent that the present invention provides a new and novel display device which is relatively cheap of manufacture and simple and easy of erection and which may be as easily collapsed, and when collapsed will occupy a relatively flat position, thus greatly facilitating shipping and transportation thereof.

The invention has been disclosed in its preferred forms. It is to be understood, however, that it is not to be limited to the construction shown and that it may be constructed in other forms without departing from the spirit of the invention. This latter is particularly true with respect to the secondary display device since it is obvious that it may be made in other forms than the circular forms in which it is shown and that I desire to cover any shape of secondary display element which is capable of circumflexion to produce tension therein, which tension is capable of utilization in the manner herein described.

Having thus described the invention, what is claimed as new, is:

1. A display device comprising in combination, a main display element, a prop for said main display element, and a circumflexed secondary display element embracing a portion of said prop and having interlocking engagement therewith to maintain the secondary display in circumflexed form.

2. A display device comprising in combination, a main display element, a supporting prop for said main display element, a secondary display element, and a plurality of locking tongues carried by said secondary display element and having interlocking engagement with said supporting prop to maintain the secondary display element in display position.

3. A display device comprising in combination, a main display element, a supporting prop for said main display element, a secondary display element circumflexed to produce tension when it is in its display position and means having interlocking engagement with the supporting prop and maintained in said interlocking engagement by tension produced by circumflexion of the secondary display element to maintain said secondary display element in display position.

4. A display device comprising in combination, a main display element, a supporting prop for said main display element, a secondary display element, said secondary display element being slotted to receive a portion of said supporting prop, locking tongues projecting from said secondary display element and each engageable in a slot in the supporting prop to retain the secondary display element in display position.

5. A display device comprising in combination, a main display element, a supporting prop for said main display element, a secondary display element embracing said prop, said secondary display element being circumflexed and thereby placed under tension when in its display position and tongues projecting from said secondary display element for interlocking engagement with the prop of the main display element to retain the secondary display element under tension and in display position.

6. A display device comprising in combination, a main display element, a supporting prop therefor, a secondary display element hingedly connected to the main display element, and means for attaching the secondary display element to said supporting prop to maintain the secondary display element in display position, said last mentioned means comprising hooked tongues projecting from the secondary display element and receivable in a slot in the supporting prop.

7. A display device comprising in combination, a main display element, a secondary display element, a supporting prop for said main display element, said secondary display element being circumflexed under tension about said supporting prop, and detachably connected thereto to maintain said secondary display element in circumflexed display position.

8. A display device comprising in combination, a main display element, a secondary display element, a two wing supporting prop, means carried by the secondary display element for maintaining the upper ends of the wings of the two wing prop in spaced relation when the device is set up in display position, and means tending normally to spread apart the wings of the two wing prop against the action of said spacing means thereby to maintain the prop in operative supporting position.

9. A display device comprising in combination, a main display element, a secondary display element, a two wing supporting prop, and locking tongues projecting from the secondary display element and engageable in slots in the wings of the supporting prop to maintain the secondary display element in display position.

10. A display device comprising in combination, a main display element, a two wing supporting prop therefor, the wings of said prop being hinged to lie flat against the rear of the main display element or extend therefrom at an angle thereto and in spaced relation to each other, a secondary display element adapted to straddle said supporting prop, said secondary display element being circumflexed and placed under tension when in display position, and means carried by said secondary display element and having detachable engagement with the wings of the supporting prop to maintain the supporting prop and secondary display element in operative display position under the tension of the circumflexed secondary display element.

11. A display device comprising in combination, a main display element, a two wing supporting prop therefor, the wings of said prop being hinged to lie flat against the rear of the main display element or extend therefrom at an angle thereto and in spaced relation to each other, a secondary display element adapted to straddle said supporting prop, said secondary display element being circumflexed and placed under tension when in display position, and means carried by said secondary display element and having detachable engagement with the wings of the supporting prop to maintain the supporting prop and secondary display element in operative display position under the tension of the circumflexed secondary display element, said last mentioned means comprising tongues extending from the secondary display element and having interlocking engagement with slots in the wings of the supporting prop.

12. A display device comprising in combination, a main display element, a supporting prop for said main display element, a secondary display device hingedly connected to the prop, said secondary display element being adapted to be circumflexed to produce tension therein when in display position, and means for attaching said secondary display device to said prop to maintain the secondary display element in circumflexed display position.

13. A display device comprising in combination, a main display element, a supporting prop for said main display element, a secondary display device hingedly connected to the prop, said secondary display element being adapted to be circumflexed to produce tension therein when in display position, and means for attaching said secondary display device to said prop to maintain the secondary display element in circumflexed display position, with the tension of said secondary display device serving to maintain the supporting prop in operative supporting position.

RICHARD EATON PAIGE.